United States Patent [19]

McGee

[11] Patent Number: 5,650,241

[45] Date of Patent: Jul. 22, 1997

[54] METAL-AIR CELL BATTERY

[76] Inventor: Richard L. McGee, 1499 Pacland Pl., Chesterfield, Mo. 63005

[21] Appl. No.: 564,949

[22] Filed: Nov. 30, 1995

Related U.S. Application Data

[63] Continuation-in-part of Ser. No. 304,737, Sep. 9, 1994, abandoned.

[51] Int. Cl.$^6$ .................................................... H01M 2/38
[52] U.S. Cl. ............................... 429/67; 429/28; 429/34; 429/62; 429/63; 429/66; 429/68; 429/59; 429/82; 429/83; 429/87; 429/95; 429/96; 429/99; 429/100; 429/101; 429/125; 429/129; 429/136; 429/138; 429/146; 429/153; 429/159; 429/161; 429/163; 429/175; 429/176; 429/186
[58] Field of Search ...................... 429/12, 22, 28, 429/34, 67, 49, 62, 63, 66, 68, 82, 83, 87, 95, 96, 99, 100, 101, 59, 123, 129, 131, 136, 138, 146, 149, 153, 175, 176

[56] References Cited

U.S. PATENT DOCUMENTS

| | | | |
|---|---|---|---|
| 3,513,030 | 5/1970 | Rasansky et al. | 136/86 |
| 3,513,031 | 5/1970 | Zaromb | 136/86 |
| 3,615,846 | 10/1971 | Plank | 136/86 |
| 3,650,839 | 3/1972 | Lang et al. | 136/86 |
| 3,935,028 | 1/1976 | Strasser et al. | 136/86 |
| 3,980,498 | 9/1976 | Urbach et al. | 429/64 |
| 4,081,693 | 3/1978 | Stone | 307/66 |
| 4,246,324 | 1/1981 | de Nora et al. | 429/17 |
| 4,560,626 | 12/1985 | Joy | 429/27 |
| 4,612,261 | 9/1986 | Tsukui et al. | 429/13 |
| 4,756,980 | 7/1988 | Niksa et al. | 429/27 |
| 4,842,964 | 6/1989 | Tarcy | 429/52 |
| 4,885,217 | 12/1989 | Hoge | 429/27 |
| 4,906,535 | 3/1990 | Hoge | 429/42 |
| 4,908,281 | 3/1990 | O'Callaghan | 429/27 |
| 4,910,102 | 3/1990 | Rao et al. | 429/51 |

(List continued on next page.)

OTHER PUBLICATIONS

John F. Cooper & Ernest L. Littauer, "Mechanically Rechargeable, Metal-Air Batteries for Automotive Propulsion", May 26, 1978.

Lockheed, Palo Alto Research Laboratories, "Aluminum-Air Battery Cell Hardware Development" Apr. 30, 1982.

John F. Cooper, K.A. Kraftick & B.J. McKinley, "Current Status of the Development of the Refuelable Aluminum-Air Battery" May 10, 1983.

Alupower, Inc. "High Energy Density Disposable Aluminum-Air Battery" (made public between Jun. 23 and Jul. 1, 1992).

"Aluminum-Air Battery Development: Toward an Electric Car" Conservation and Solar, date unknown, pp. 20-33 No month or year available.

John F. Cooper, "Aluminum-Air Power Cell Research and Development Progress Report", Dec. 1984.

Geoff Scamans, "Advances in Battery Technology", Chemistry and Industry, Mar. 17, 1986.

Nigel Fitzpatrick and Geoff Scamans, "Aluminum is a Fuel for Tomorow", New Scientist, Jul. 1, 1986, pp. 34–37.

Nigel Fitzpatrick and David Strong, "Aluminum-Air, a Battery/Battery Hybrid for an Off-Road Vehicle", Nov. 1988.

D.W. Parish et al., "Demonstration of Aluminum-Air Fuel Cells in a Road Vehicle", SAE Technical Paper Series 891690, 1989, pp. 64–69 No month available.

*Primary Examiner*—Bruce F. Bell
*Attorney, Agent, or Firm*—Polster, Lieder, Woodruff & Lucchesi, L.C.

[57] ABSTRACT

A metal-air battery assembly having plurality of free standing metal-air cells forming a cell group within a battery case assembly. Each free standing cell has flexible, compressible walls capable of containing electrolyte, the walls comprising air cathodes including cathode current distributors. Each cell has a split anode assembly and current. The anode assembly has one or more reactive anode fuel plates and an anode current collector. Each of the cells is free standing and easily replaced. The battery case assembly has a mechanism for compressing the cells when the lid is closed and releasing the cell group for servicing when the lid is open.

32 Claims, 8 Drawing Sheets

U.S. PATENT DOCUMENTS

| | | | |
|---|---|---|---|
| 4,950,561 | 8/1990 | Niksa et al. | 429/27 |
| 5,004,654 | 4/1991 | Hunter et al. | 429/50 |
| 5,032,473 | 7/1991 | Hoge | 429/42 |
| 5,053,375 | 10/1991 | Rao | 502/101 |
| 5,192,627 | 3/1993 | Perry, Jr. et al. | 429/17 |
| 5,415,949 | 5/1995 | Stone et al. | 429/63 |
| 5,439,758 | 8/1995 | Stone et al. | 429/63 |

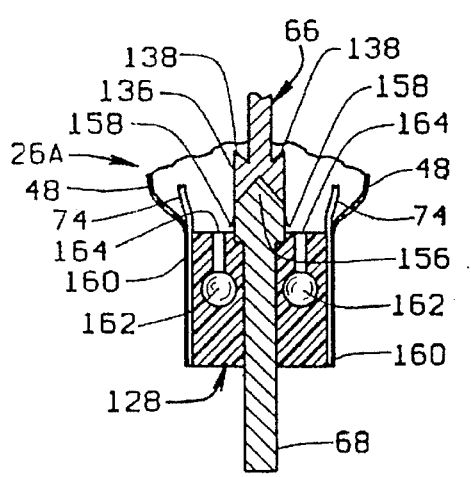
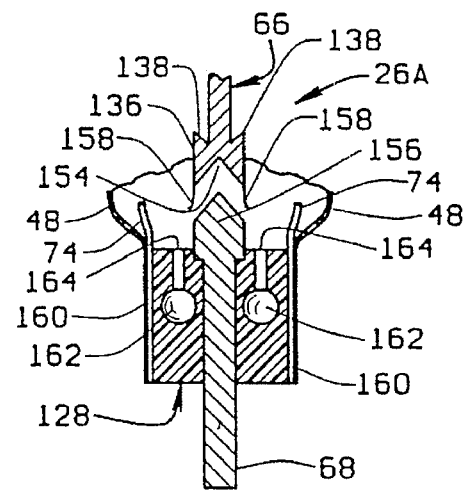
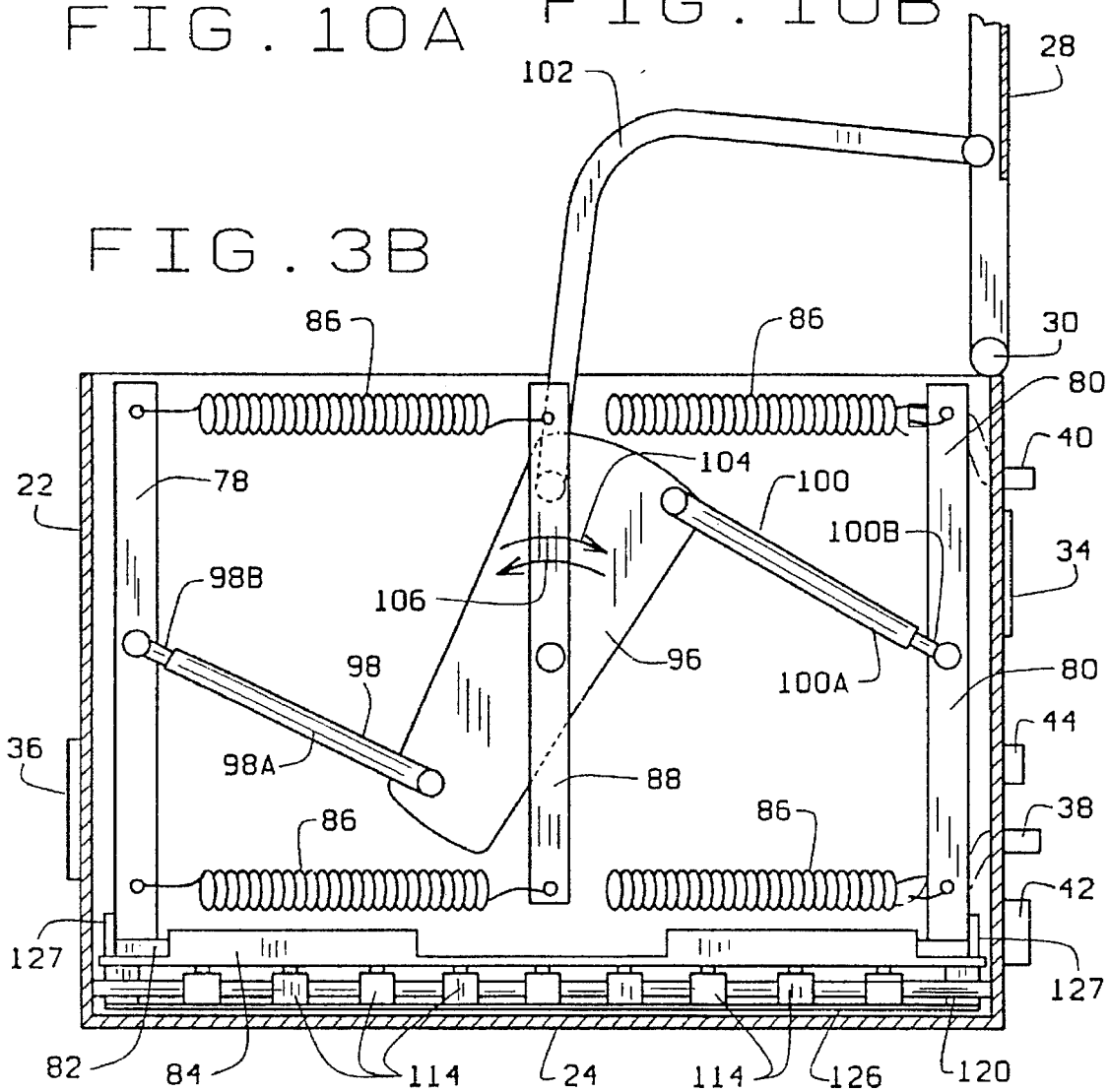

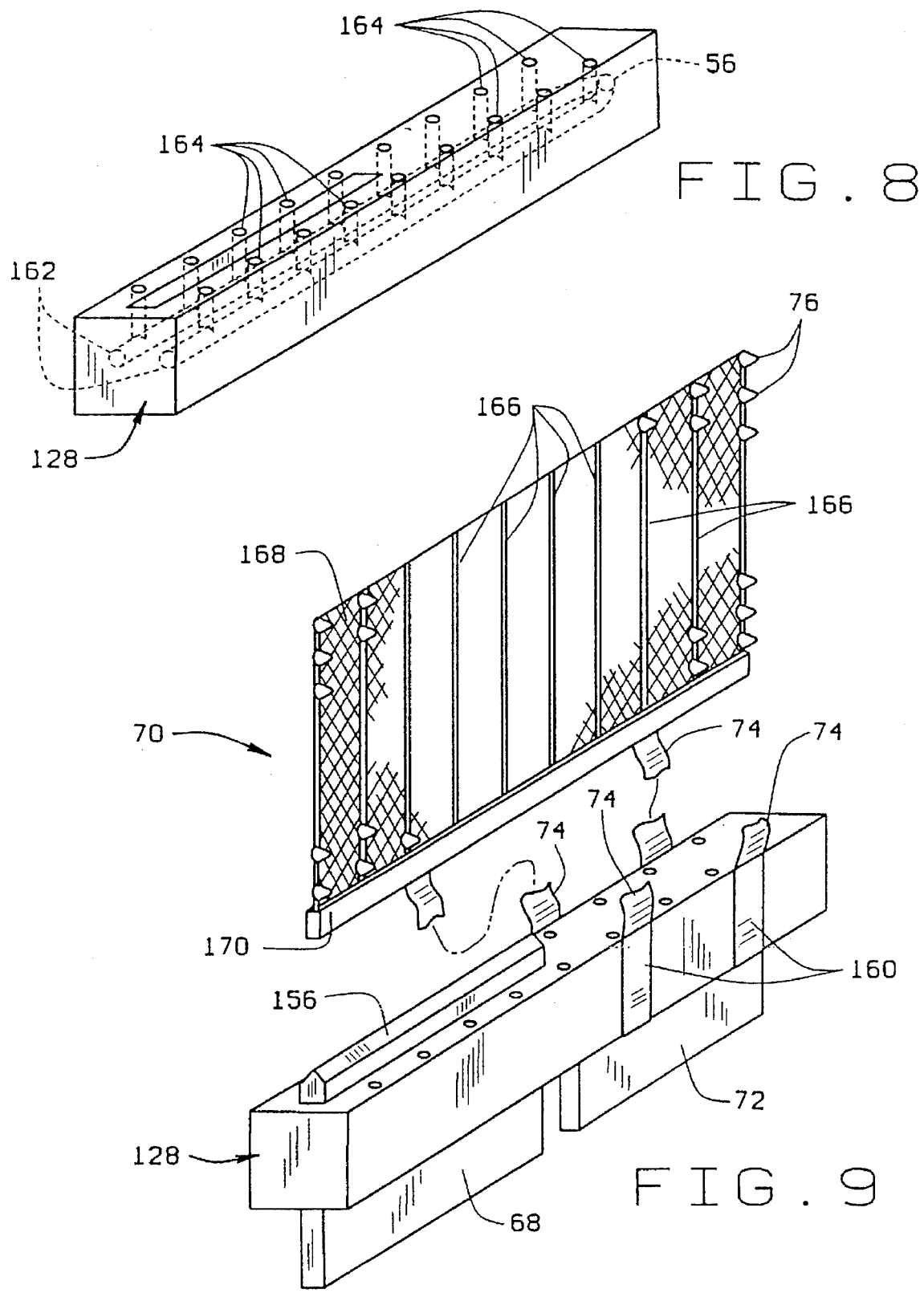

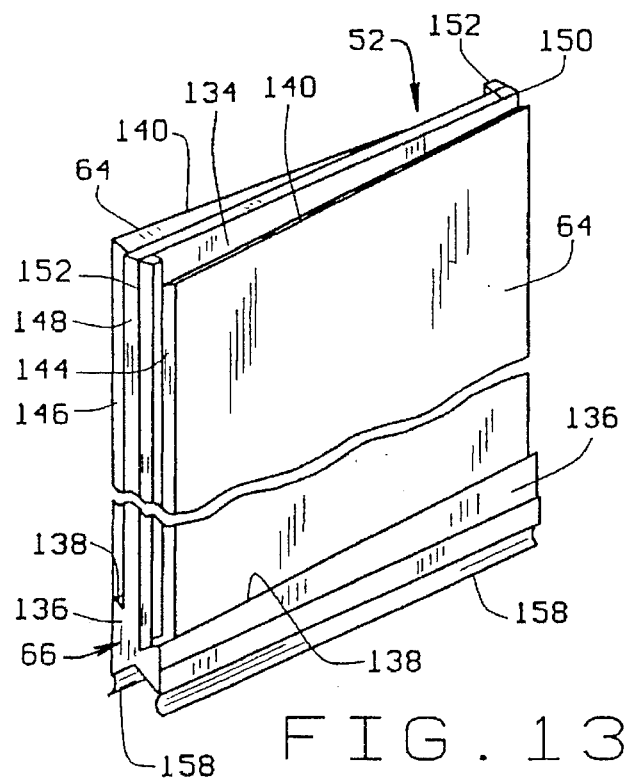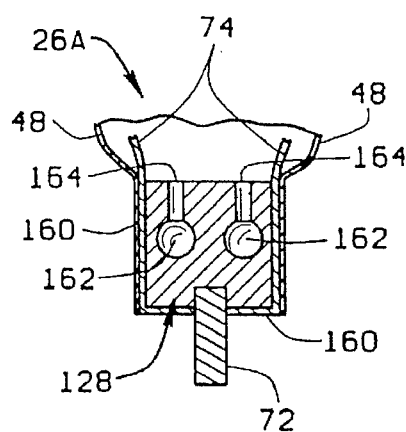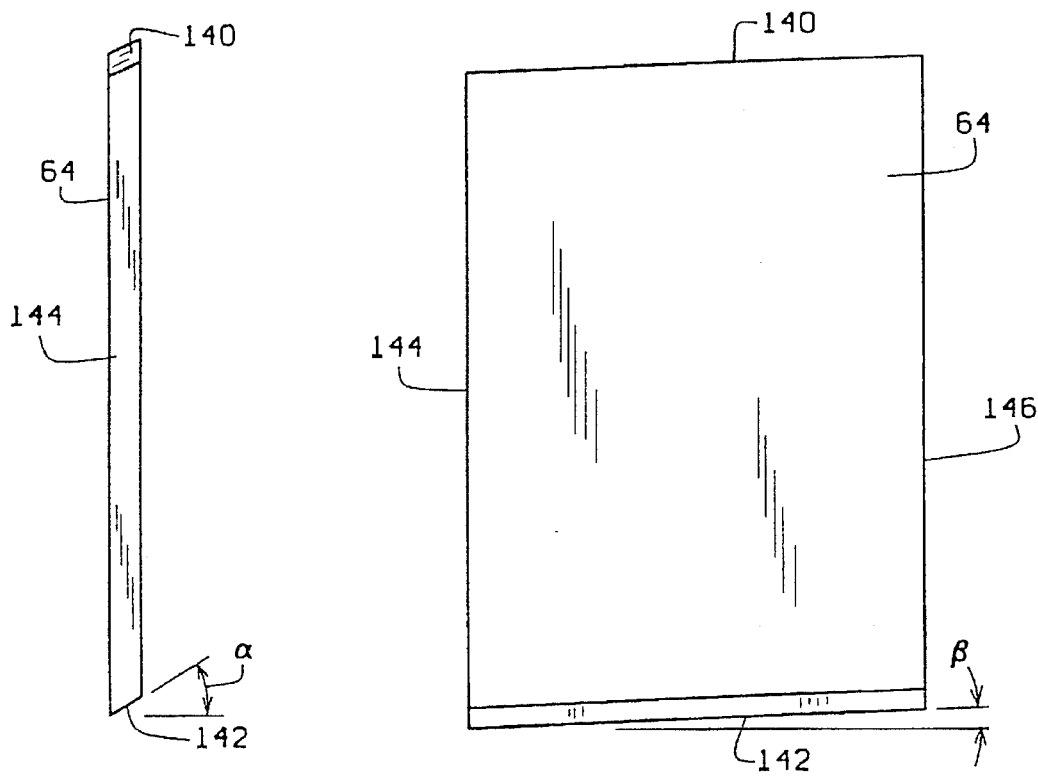
FIG. 13
FIG. 11
FIG. 12B
FIG. 12A

METAL-AIR CELL BATTERY

BACKGROUND OF THE INVENTION

This application is a continuation-in-part of application Ser. No. 08/304,737 filed Sep. 9, 1994, now abandoned.

This invention relates generally to batteries and more particularly to a high energy metal-air cell battery.

Metal-air cell batteries generally have several serially connected metal-air cells. Each cell has an anode made of a reactive metal such as aluminum or zinc and an air cathode spaced from the anode. A suitable electrolyte, such as an aqueous solution of KOH, NaOH or NaCl, electrochemically couples the anode and cathode to produce an electrical potential such that current can flow to an external electrical load. As shown in the Lawrence Livermore National Laboratory (LLNL) Report UCRL 53536 dated December 1984, current densities up to 1000 milliamperes per square centimeter ($ma/cm^2$) are to be expected from an aluminum-air cell. When the cell is dimensioned properly, (i.e., the "X" "Y" dimensions sized to provide the needed working area between the anode and cathode) circuit currents in excess of 500 amperes can be produced and delivered to a load. Similarly, the anode thickness or "Z" dimension determines the total energy that is contained in each anode reacted in a cell. For cells intended to deliver high currents, both the cathode and anode must be capable of conducting these high currents without excessive resistive ($I^2R$) losses which can result in overheating and other adverse effects. During the electrochemical reaction, the anode in each cell is consumed, oxygen from atmospheric air is catalytically reduced and combined with water from the electrolyte forming hydroxyl (OH) ions. Water is thus depleted via chemical reaction and the molar content of the electrolyte changes. The reactive metal anode reduces in thickness as it gives up its stored energy. If the anode constitutes the only means for carrying current, the conductive capacity of the cell decreases as the anode is consumed. After the reactive metal anode is expended to the point where it must be replaced, the cell must be refueled with a new anode and fresh electrolyte. Also, state-of-the-art cathodes are somewhat short-lived and require periodic replacement. Metal-air battery servicing generally requires draining of spent electrolyte from the cells of the battery. In some cases, physical disconnection of the anode from the cathode is required between each cell followed by adding new metal anodes one-by-one, reconnecting the cells in series to reform the battery and replenishing the electrolyte. In some cells, replacement of the cathode is a major task. The servicing operation in prior art metal-air batteries is awkward, time consuming and usually results in the machine or device that is powered by the battery being inoperative for an extended period during servicing. In most prior art, a significant portion of the anode must be discarded resulting in unnecessary waste of costly anode material.

Another problem with some prior metal-air cell batteries is that during anode consumption the distance between the anode and cathode increases causing an increase in internal resistance with increased heating and a decrease in voltage and power output with loss of efficiency of the battery.

Some solutions to the foregoing problems are presented in U.S. Pat. Nos. 4,560,626, 5,415,949 and 5,439,758. These patents are part of the reference herein to "prior art". Certain aspects of the prior art can be improved.

There is a need for metal-air cell batteries specifically intended for continuous duty, high power and rapid turn-around applications (e.g., operation of a fork lift truck and over the road vehicles) in which large currents (e.g., 300 amperes and higher) must be produced and conducted continuously by each cell and between each cell within a battery of cells. Typically, metal-air cells shown in prior art rely on the electrical conductivity of the anode to conduct all or a significant part of the current through the cell. In any cell where the anode is not self replacing, such as the LLNL wedge cell, the anode is relied upon to conduct cell current. The current carrying capacity of these cells decreases as the anode is expended. Moreover, some metal-air cells employ a thin screen to distribute the current at the cathode. That construction also limits the continuous current carrying capacity of the cell.

In order to service and refuel the metal-air battery disclosed in prior art, several steps are necessary and require significant time to complete. The delays are particularly inconvenient and not cost effective where daily servicing is required. Some prior art cells must be disconnected from tubing delivering (and removing) electrolyte to the cell, and electrical conductors between the cells must be disconnected by unscrewing threaded devices. Repeatedly connecting and disconnecting electrolyte plumbing and electrical connections to each cell for servicing the battery is time consuming and may have a potentially adverse effect on these connections.

There is a need for metal air cells that use simple flat plate anodes which can be sheered or cut from sheet stock. Prior art designs are inefficient in their use of anode material and some cells may be prone to electrolyte leaks where the anode connector penetrates the cell closure. There is a paralleling need for cells in which replacement of the cathodes is a simple process.

In addition, compression of the battery to maintain a fixed spacing between the anode and cathode of each cell therein will produce movement of the cells within the battery case as the anodes are consumed. This movement of the cells requires that fluid connections between the cells and the external fluid systems and electrical connections of the cells to each other and to the exterior of the battery be maintained as the cells move.

SUMMARY OF THE INVENTION

Among the several objectives and features of the present invention may be noted the provision of an improved, cost effective, rugged, high current, split anode, free standing metal-air cell which overcomes disadvantages and deficiencies associated with prior art metal-air cells and metal-air cell batteries; the provision for quick-disconnects that implement removal and replacement of individual cells for battery servicing or cell replacement; the provision of such a cell which utilizes a split anode with one half of the anode, a simple plate of anodic fuel, located on each side of an anode current collector, said current collector being capable of continuously and selectively conducting currents ranging from very small to very high with negligible electrical loss; the provision of such a free standing cell which is capable of continuously and selectively conducting the same currents at the cathode; the provision of such a cell in Which more efficient use of the expendable anode is made; the provision of such a cell in which the capability of the cell to conduct current at the anode remains substantially constant as the anode approached the condition of being completely expended; the provision of such a cell which can be rapidly opened for servicing and re-sealed for use; the provision of such a cell which permits the quick, easy and non-destructive removal and replacement of its expended anode to replenish the cell; the provision of such a metal-air cell which permits quick, positive and non-destructive electrical connection and disconnection of the anode within the cell; the provision of such a cell in which there is even flow of fresh electrolyte throughout the cell and removal of water depleted electrolyte which contains entrained anode reaction by-products, the provision of air diverter-separators external to the cells which assure uniform flow and supply of depolarization air (oxygen) to the cathode of each cell; the provision of such a free standing metal-air cell which, when fueled and sealed can be operated in any attitude (position) without spillage or loss of performance.

Further among the several objects and features of the present invention may be noted the provision of an improved metal-air cell battery case assembly which is sized to contain, position and support the free standing metal-air cells while providing electrical and electrolyte connections plus depolarization air to said cells; a case assembly which when fitted with the above described cells constitutes a battery that is capable of operating in any attitude without spilling electrolyte, the provision by which opening the lid of the battery case automatically removes the compressive force on the cells within and simultaneously repositions the cells apart to facilitate servicing (i.e., removal and replacement or replenishment of the metal-air cells or of the anode assemblies within the cells) and automatically re-establishes the compressive force on the metal-air cells as the lid is closed; the provision of such a battery case assembly which permits the metal-air cells therein to be replenished without disconecting the electrolyte plumbing to the metal-air cell; the provision of such a battery case assembly in which flexible positive electrical connections are maintained during operation as the cells move under the effects of compression and consumption of their anodes; the provision of such a battery case assembly which permits quick, easy and non-destructive electrical and electrolyte connection and disconnection for replacement of any metal-air cell within the battery of cells; and the provision of such a battery case assembly in which the anode "fuel remaining" and "temperature" of components within the case may be accurately and conveniently monitored with related electrical signals transmitted outside the case where the information therein can be remotely displayed or otherwise utilized for more efficient system operation and control of variables such as regulation of air and electrolyte flow to match electrical loading conditions.

Generally, a metal-air cell battery of the present invention includes one or more free standing flexible, compressible cells, each cell having a solid base with cathodic material bonded thereto and constituting first and second opposing walls that form a pocket above the solid base of the cell, a pocket with an open top with an elastomer seal affixed along the top of each wall to form a closure to the pocket when pressed and held together, thus forming the physical parts of the cell, each wall thereof incorporating an air cathode including a cathode high current distributor. A cathode terminal on the hard base is electrically connected to the high current distributor inside the cell and the terminal being located at least partially outside of the cell, being attached to and extending below the hard base. An anode assembly, inside the free standing cell, includes an anode high current collector with a quick disconnect at its base, the current collector mounting, locating and making firm mechanical and electrical connection with metal split anode fuel plates positioned on each side thereof within the cell, the fuel plates being located in generally opposing relationship to the air cathodes. An anode terminal is bonded to and extends through the solid base from a location within the free standing cell to a location generally exterior to the cell, the interior portion constituting the mating half of a quick disconnect with the anode assembly. The metal split anode fuel plates and air cathodes are capable of electrochemical reaction in the presence of the electrolyte to produce high energy electrical power. Conical, non-conducting spacers between the air cathodes and the metal split anode fuel plates keep the fuel plates from contacting the air cathodes when the cell walls are subjected to an external force that urges the cell walls toward the internal anode assembly. The cathode high current distributor comprises an electrically conductive screen, which is generally thin and flat and has opposite faces. Spaced-apart major conductors each are electrically bonded to the distributor screen along its length and extend across one of the faces of the distributor screen thereby increasing the current carrying capacity of the current distributor and hence the cell.

In another aspect of the invention, a metal-air battery cell in which the anode assembly further includes an anode current collector shaped to assure intimate contact with and electrical connection to the metal split anode fuel plates simply by physically placing the fuel plates on the current collector and subjecting the assembly to a light compressive force. The anode current collector is electrically conductive, sized to continuously conduct full cell current and chemically nonreactive both in the presence of the electrolyte and during the electrochemical reaction between the metal split anode fuel plates and the electrolyte.

In still another aspect of the present invention, a battery case assembly for a metal-air cell battery having one or more free standing metal-air cells. The battery case assembly comprises a rectangular box defining a volume sized and shaped for receiving the metal-air cells with an air diverter-separator located at both ends of each group of cells and air diverter-separators interspersed between each cell within the group (herein collectively referred to as a "cell group"), an air inlet and an air outlet in the case permitting passage of air (from a slightly pressurized source not part of this invention) to each cell within the case, passing through and out of the case; and insulated electrical power connector means in the case for flexible, series connecting the cells within the case and with flexible electrical conductors leading to external connectors on the case for transmission of electrical power from the cell group in the case to a load outside the case. A first compression member which engages one end of the cell group in the case, and a second compression member, which engages the opposite end of the cell group in the case, are disposed in generally opposing relation within the case and positioned to receive the cell group between them. Means are provided for urging the first and second compression members toward one another thereby to compress the flexible cells and maintain spacing within each cell between the air cathode at each wall and each of the split anode fuel plates positioned between the cathodes in each cell at a distance-established by the conical spacers affixed to the cathode current collectors. A compression member actuator mechanism being provided which, when actuated, is capable of forcing the first and second compression members apart from one another against the force of the urging means thereby to facilitate removal and replacement of the cell group, or individual cells, or replenishment of the cells within the case.

Other objects and features of the present invention will be in part apparent and in part pointed out hereinafter.

BRIEF DESCRIPTION OF THE DRAWINGS

FIG. 3B is a schematic right side elevation of the battery case with the near wall of the case removed showing its configuration when the case lid is opened and the metal-air cell group removed;

FIG. 8 is an enlarged perspective of the solid base block of the metal-air cell with anode and cathode terminals of the cell removed and electrolyte delivery passages shown in hidden lines;

FIG. 9 is the perspective of FIG. 8 but showing the anode terminal in the base block and the cathode terminals on the base block and one cathode current distributor of the cell;

FIG. 10A and 10B are enlarged, fragmentary vertical sections of the metal-air cell base block illustrating the internal connection and disconnection of an anode current collector to the anode terminal within the cell; and FIG. 11 is an enlarged fragmentary vertical section of the metal-air cell base block showing the cathode terminal;

FIG. 12A is a front elevation of a metal split anode fuel plate of the metal-air cell;

FIG. 12B is an end elevation of the metal split anode fuel plate;

FIG. 13 is a perspective of the anode assembly showing the anode current collector of the cell with the metal split anode fuel plates positioned thereon;

Corresponding reference characters indicate corresponding parts throughout the several views of the drawings.

DETAILED DESCRIPTION OF A PREFERRED EMBODIMENT

Figure 1:
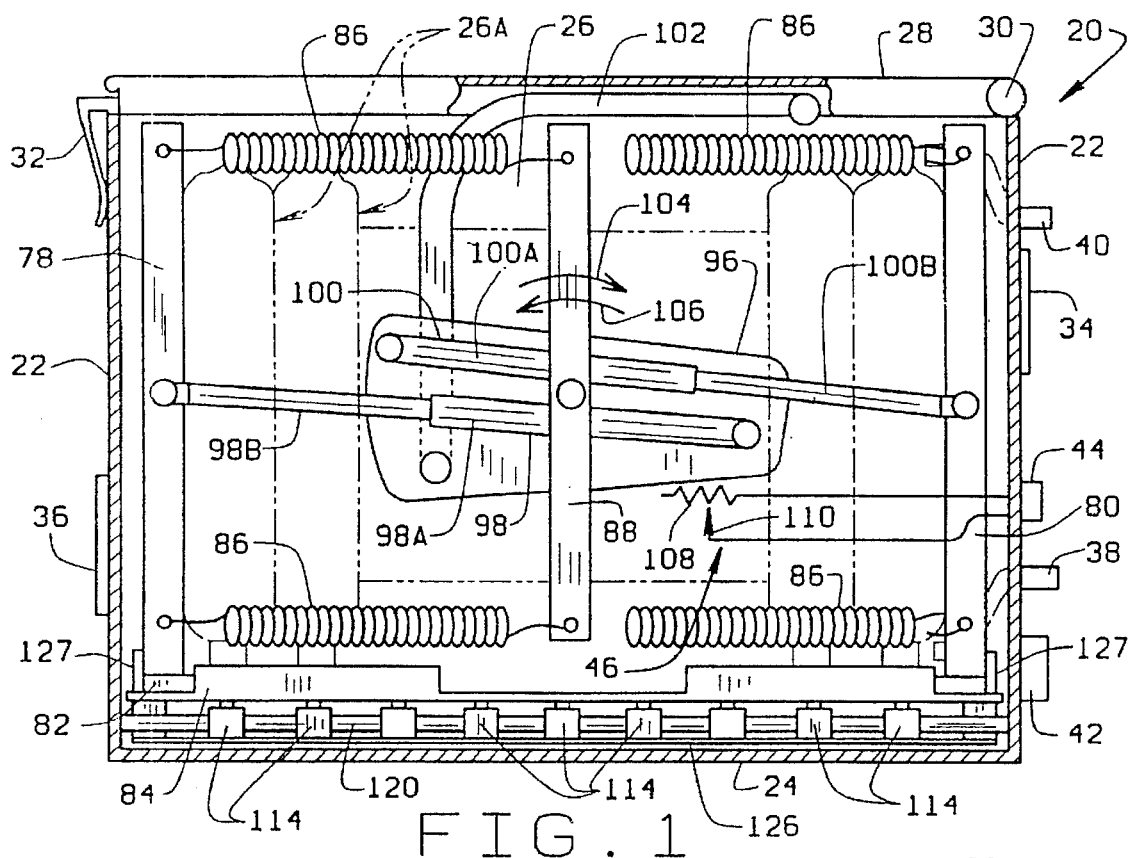
FIG. 1 is a schematic right side elevation of a metal-air cell battery assembly with the near wall of its case removed and the lid closed to show internal construction, and with its metal-air cell group shown in phantom therein.
Figure 3A:
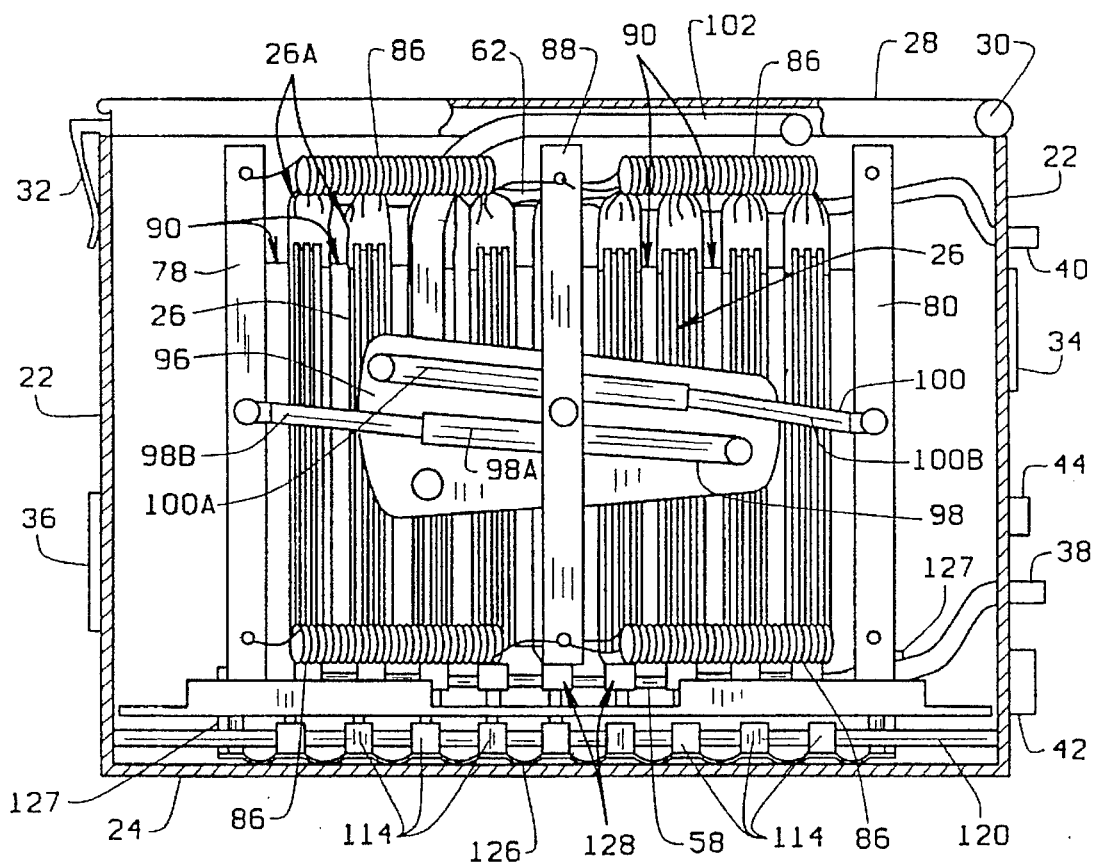
FIG. 3A is a schematic right side elevation of the battery with the near wall of the case removed and the lid closed to show its internal configuration when anode fuel-plates within the metal-air cell group are substantially expended.

Referring now to the drawings, and in particular to FIG. 1, a metal-air cell battery assembly of the present invention is shown to comprise a battery case assembly including a case (generally indicated at 20) having four spaced apart side walls 22 and a bottom 24 arranged in the shape of a rectangular box having a top that can be opened, said box being sized for containing a metal-air cell group 26, (illustrated in phantom in FIG. 1 and shown in FIGS. 3A, 15A and 15B) consisting of free standing metal-air cells 26A with air diverter-separators 90 located at each end and disbursed between each cell within the group. A lid 28 mounted by a hinge 30 on an end wall 22 of the case may be pivoted between a closed position in which the lid closes the open top (FIG. 1), and an open position in which the open top of the case is exposed (FIG. 3B). The case 20 and lid 28 are preferably made of a robust, inert synthetic resin material. A latch 32 mounted on the lid 28 opposite the hinge 30 is provided to fasten and hold the lid in the closed position until the latch is released. The lid 28, or the upper edge of the side walls 22 are provided with a resilient sealing material (not shown) so that the interior of the case 20 is sealed when the lid is closed.

The battery case assembly and metal-air cell group 26 contained therein are preferably part of an electrochemical power generation system (not shown), such as described in the aforesaid U.S. Pat. Nos. 5,415,949 and 5,439,758. An air inlet 34 and an air outlet 36 in opposing end walls 22 of the case 20 permit passage of depolarizing air into the case and through the cell group 26 via the air diverter-separators 90 to the cell walls 48 where oxygen is catalytically removed therefrom, and the oxygen depleted air is then vented out of the case. An air pump (not shown) located outside the case is preferably employed so that the air in the case 20 at the cell group 26 is at a pressure somewhat greater than one (1) atmosphere. The air pump serves the same function as the air pump 108 described in U.S. Pat. No. 5,439,758. Electrolyte is circulated through the metal-air cells 26A in the case 20 by way of an inlet fitting 38 and an outlet fitting 40 in the case wall 22. The manner of external circulation is similar to that described in U.S. Pat. No. 5,439,758. Two electrical power connectors 42 (FIGS. 1, 3A, and 4), one positive and one negative mounted on the case wall 22 are provided for transmitting the electrical power generated by electrochemical reaction in the metal-air cells 26A to locations exterior of the case. An instrumentation connector 44 on the case wall 22 permits connection of a fuel-remaining sensor (generally located at 46) and temperature sensors (not shown) in the case to monitor and control circuits (not shown) outside the case.

Figure 6:
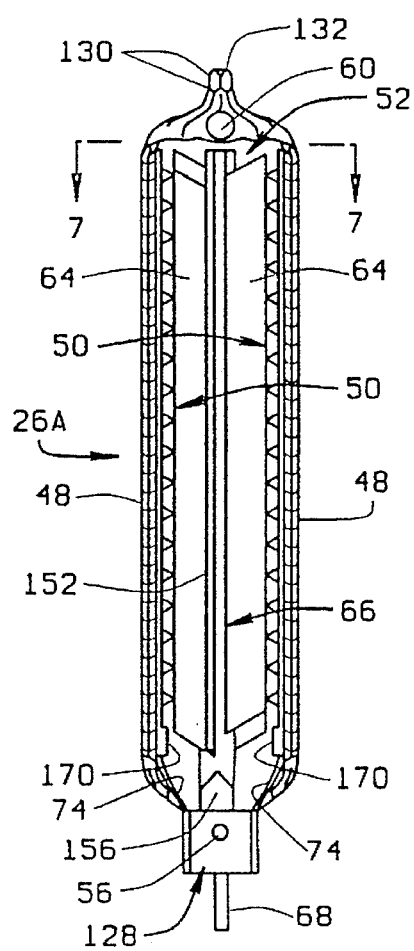
FIG. 6 is an end elevation of one free standing metal-air split anode cell of the battery with a portion of the cell wall broken away to show the internal configuration of the cell including the air cathodes and anode current collector with split anode fuel plates positioned thereon.
Figure 7:
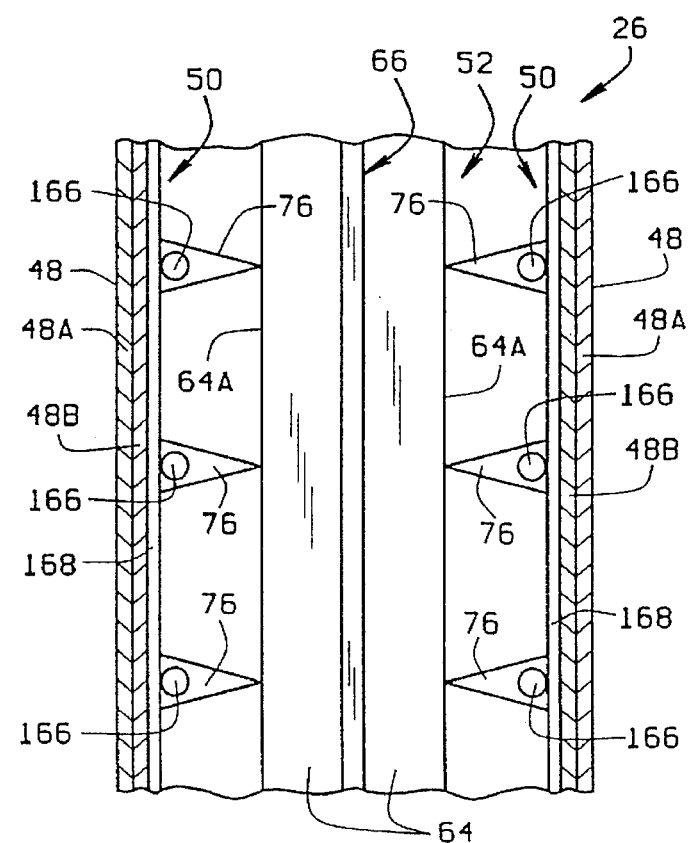
FIG. 7 is an enlarged, fragmentary section of the metal-air cell taken in the plane including line 7—7 of FIG. 6.

In a preferred embodiment, the free standing metal-air cells 26A are of the dual cathode, split anode type, each having two air cathodic opposing walls 48 which form a pocket (FIG. 6), two air cathodes indicated generally at 50, and a split anode assembly indicated generally at 52 (FIG. 7). The cell walls 48 are made of air permeable, electrolyte impermeable material 48A coated in the interior with a catalytic film 48B. The catalytic film 48B has been shown of substantial thickness in FIG. 7 for clarity. In fact, the catalytic film 48B is substantially less thick than the air-permeable, electrolyte impermeable material 48A of the walls 48. Each cell 26A has an inlet port 56 connected via a branch tube 58A to a delivery tube 58 (FIGS. 2 & 15B) for delivering electrolyte into the cell and an outlet port 60 connected via a branch tube 62A to a discharge tube 62 for removal of depleted electrolyte and anode reaction by-products. The anode assembly 52 (FIGS. 6 and 13) includes a split anode consisting of two flat metal anodic fuel plates 64 located on and supported by a conductive, non-reactive anode current collector (indicated generally at 66)

connected to an anode terminal 68 which extends from within the cell 26A through the solid base block of the cell to a location exterior of the cell. The anode fuel plates 64 are preferably made of an aluminum alloy, but may be made of other suitable electrochemically active material such as zinc. Each of the anode fuel plates 64 has a reaction face 64A in closely spaced relation with an adjacent air cathode 50.

In this preferred embodiment, each of the two cathodes 50 includes a current distributor (generally indicated at 70 in FIG. 9) located between the cell wall 48 and corresponding anode fuel plate 64 and that portion of the adjacent wall 48 which is generally co-extensive with the current distributor (FIGS. 6 and 9). Construction of the cell walls 48 makes the entire wall area capable of use in cathodic operation, but significant cathode reactions are generally confined to those regions of the walls adjacent to the current distributors 70. A cathode terminal 72 (FIG. 9) is attached to both of the cathode current distributors 70 in the cell 26A by flexible electrical conductor straps 74. The reaction surface 64A of each anode fuel plate 64 is held from contacting the cathode current distributor 70 by multiple insulating spacers 76. It is to be understood that the metal-air cell 26A could be of the type having a single cathode assembly with opposing anode mounted on a single sided current collector and still fall within the scope of the present invention.

Figure 2:
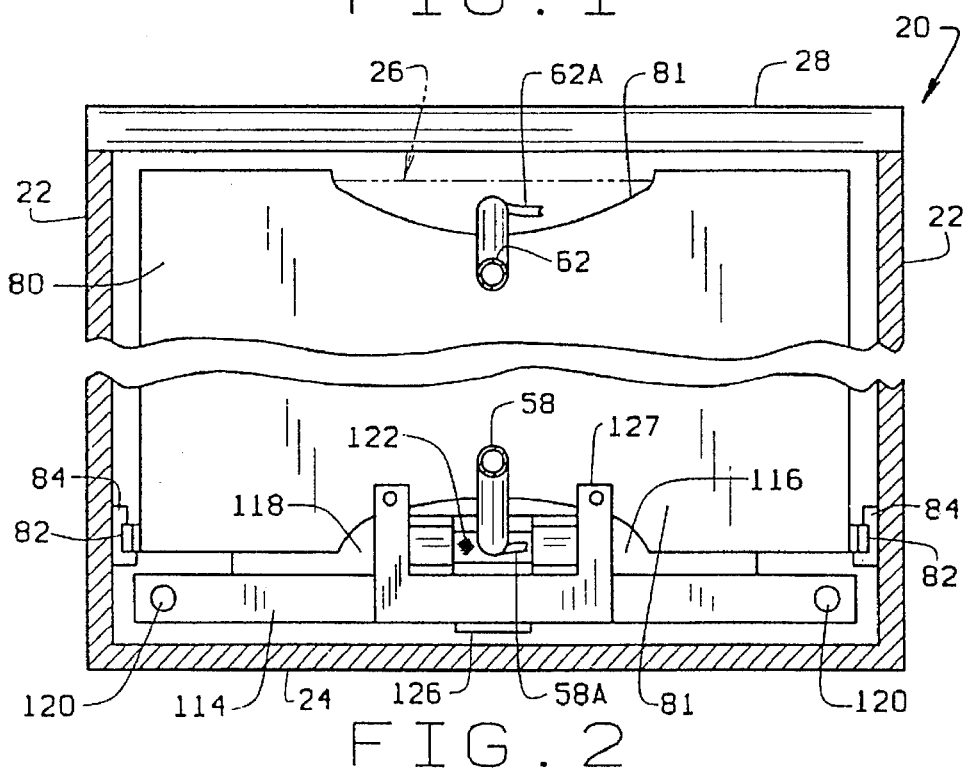
FIG. 2 is a fragmentary rear end elevation of the battery with the near wall of the case removed to show internal construction.

Referring now to FIGS. 1, 2, 3A, and 3B, a mechanism for compressing the metal-air cell group 26 to maintain each split anode fuel plate 64 and its corresponding air cathode 50 at a fixed spacing includes first and second compression plates (designated 78 and 80 respectively) having faces located in generally opposing relation with each other. The compression plates 78,80, as shown in FIG. 2, have arcuate cutouts 81 permitting access for the electrolyte inlet and outlet tubes 58 and 62 through the compression plates to the cells 26A. Each of the compression plates 78 and 80 is mounted within the battery case 20 for sliding motion of each compression plate generally lengthwise of the case toward and away from the other compression plate. Mounting members in the form of elongated rails 82 extend from both lateral edges of the plates 78, 80, near the bottom of the plates. The rails 82 are inserted and slide in guide channels of respective guide tracks 84 mounted on opposite side walls 22 of the case. The rails 82 and guide tracks 84 are shaped and sized to permit sliding motion of the compression plates 78, 80 lengthwise of the case 20, and simultaneously hold the plates from becoming canted with respect to the vertical and horizontal directions.

The first compression plate 78 is configured to engage with the air diverter-separator 92 which is in intimate contact with a metal-air cell 26A at one end of cell group 26, and the second compression plate 80 is configured to engage with the air diverter-separator 90 which is in intimate contact with the metal-air cell at the opposite end of the cell group 26. The compression plates 78, 80 are urged toward each other by springs 86 connected between the lateral edges of each compression plate and a center anchor 88 attached to the case 20. In the preferred embodiment, there are four springs 86 for each compression plate 78, 80 (two at each lateral edge). Only two springs 86 for each compression plate and one center anchor 88 are shown in the drawings, the springs and center anchor at the opposite side of the case 20 being of identical construction and arrangement. Under the urging of the springs 86, the compression plates 78, 80 bear against the cell group 26 at opposite ends of the cell group so that the internal spacing between each anode fuel plate 64 and its corresponding air cathode 50 within each cell 26A remains approximately the same (e.g., 1.5 mm to 3 mm) during operation as the anode fuel plates are expended and diminished in thickness.

Figure 14:
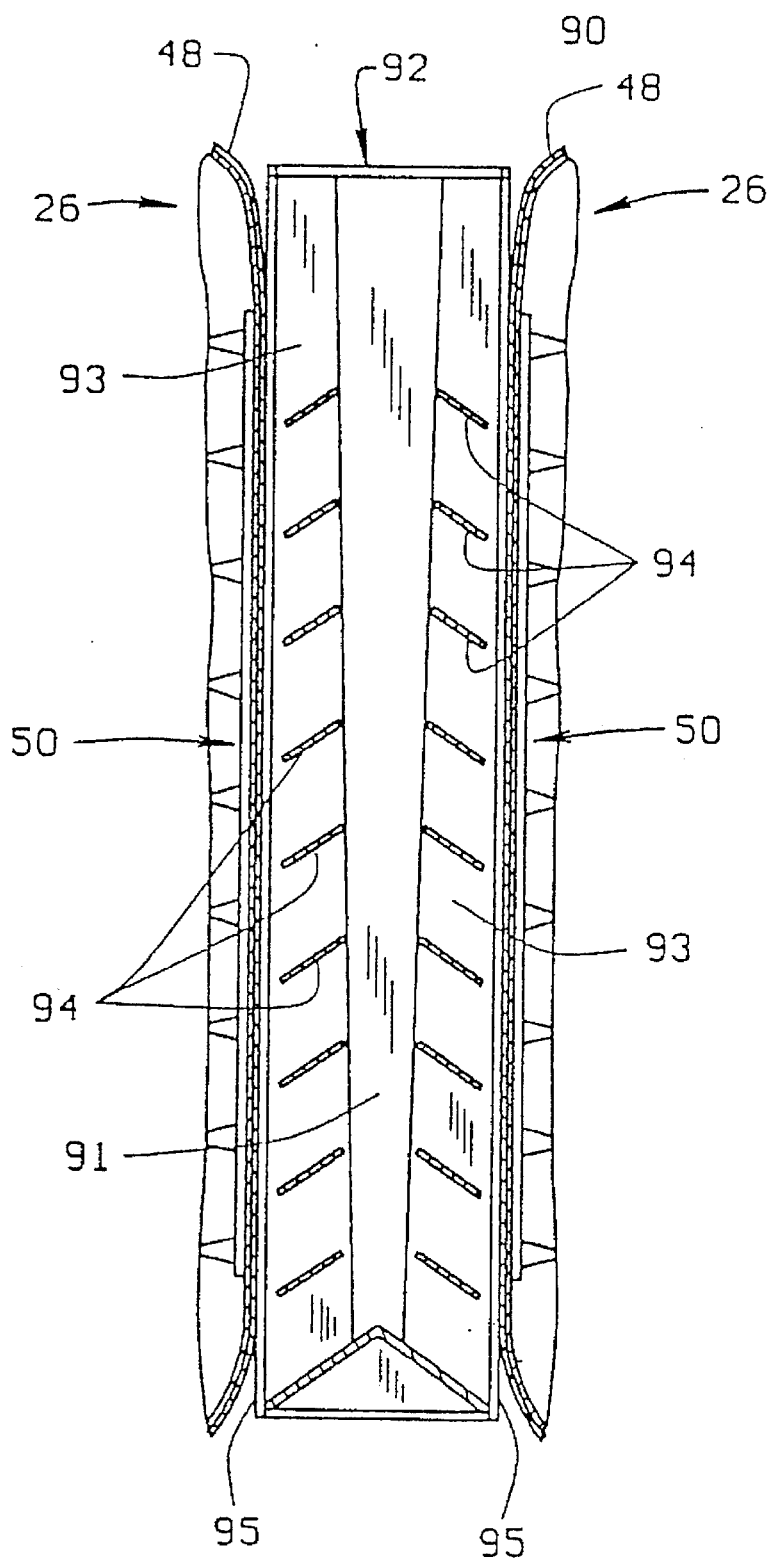
FIG. 14 is an enlarged fragmentary section of adjacent cells in the battery showing the relative location of an inter-cell air diverter-separator.
Figure 15A:
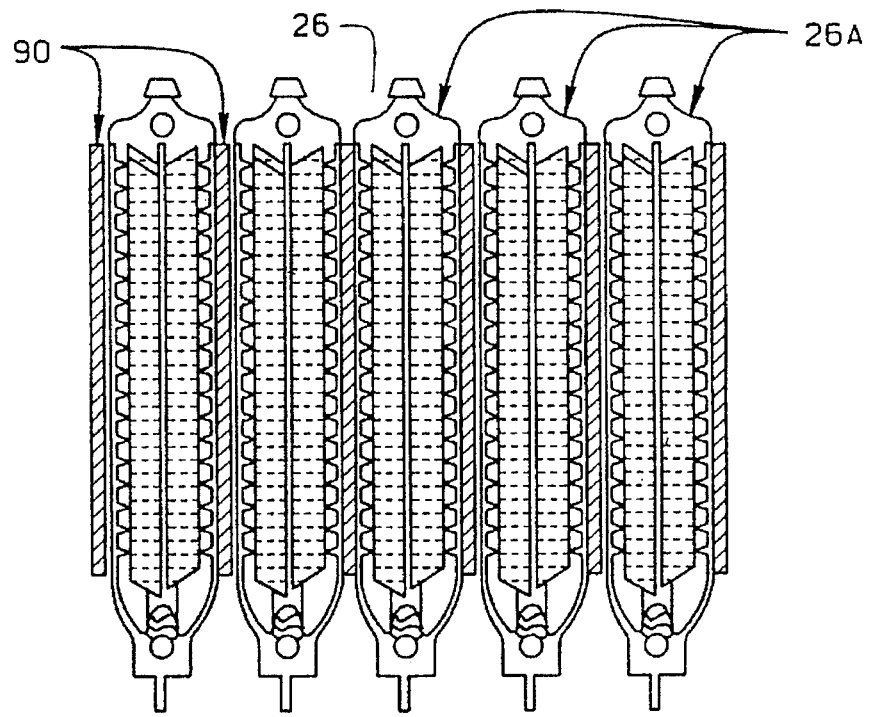
FIG. 15A is a side elevation of a group of metal-air cells with air diverter-separators placed at each end of the group and an air diverter-separator interspersed between each cell within the group, showing the electrolyte inlet and outlet and which collectively constitutes a typical cell group.
Figure 15B:
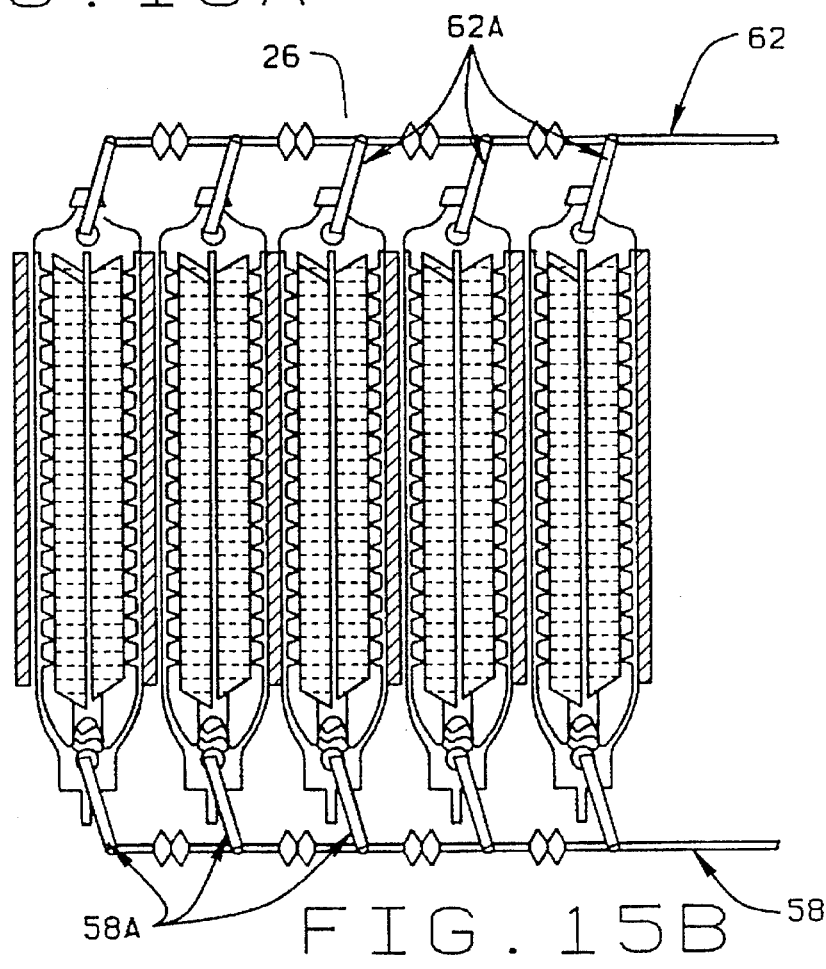
FIG. 15B is a side elevation of a cell group showing the electrolyte inlet and outlet tubing connections.

As shown in FIGS. 3A, 15A and 15B, a plurality of inter-cell air diverter-separators, indicated generally at 90, are interposed between adjacent cells 26A and between cells at the end of the cell group and the compression plates 78, 80 to provide external air spaces adjacent to each cell walls 48 so that depolarization air can circulate around the cells and to the air cathodes 50. Referring to FIG. 14, each inter-cell air diverter-separator 90 of the present invention is preferably formed of a suitable molded plastic having the general shape of a thin rectangular box with closed end walls 91 and a substantially open top for passage of air into the air diverter-separator 92. A plurality of thin, flat vertical fins 93 are spaced horizontally at substantially even increments between the end walls 91 of the air diverter-separator 90. The outer vertical edges of the fins 93 on opposite sides of the air diverter-separator 90 engage the walls 48 of the respective adjacent cells 26A. A plurality of vertically spaced louvers 94 inside the air diverter-separator 90 extend horizontally from one end wall 91 to the other between the fins 93 and slope generally upwardly away from the vertical edges of the fins engaging the cells 26A. The fins 93 and louvers 94 are preferably molded as one piece to form a rigid air diverter-separator 90 capable of supporting the compressive forces applied to the cell group 26 to maintain the spacing and air passage between cells therein.

The horizontal louvers 94 each guide a portion of the air flowing through the air diverter-separator 90 from the top opening 92 therein to the cell walls 48 of the adjacent cells 26A. The outer horizontal edges of the louvers 94 are spaced inward from the vertical edges of the fins 93 permitting air to flow downward along the face of the cell wall 48 and out the bottom of the air diverter-separator 90 through the opening 95. For each louver 94 at one side of the air diverter-separator 90 there is an opposing louver at the opposite side. The horizontal spacing between opposing louvers 94 decreases from the top of the air diverter-separator 90 to the bottom. In this way, air moving through the air diverter-separator 90 is compressed as it moves toward the bottom of the air diverter-separator so that pressure of the air reaching the wall 48 is uniform from top to bottom of the cell 26A.

The thickness of the air diverter-separator 90 (i.e., spacing thereby between adjacent cells) is selected generally to assure uniform supply of depolarization air to the cell cathodes 50 and to provide some assistance in the equalization of the temperature of the cells in cell group 26. The thickness of the air diverter-separator 90 between cells 26A may be varied so that spaces between adjacent cells vary to achieve variable cooling of the cells. For example, the inter-cell spacing can decrease from one end of the cell group 26 to the other, or the inter-cell spacing can decrease from the center of the cell group 26 toward the ends of the cell group.

To aid in servicing the free standing metal-air cells 26A within the battery case 20, an actuator mechanism is provided to selectively force the first and second compression plates 78, 80 apart against the force of the springs 86 each time the case lid 28 is opened. An identical actuator mechanism is located on the opposite side of the case. Referring now to FIGS. 1, 3A and 3B, the actuator mechanism includes a rotor 96 mounted via a center pivot on the center anchor 88 between the compression plates 78, 80. A first push bar 98 is attached at one end by a pivot on the rotor 96 and the push bar is attached at the opposite end by a pivot on the first compression plate 78. Similarly, a second push bar 100 is attached at one end by a pivot on the rotor 96 and attached at the opposite end by a pivot on the second compression plate 80. Each push bar 98, 100 includes an outer tubular portion 98A, 100A which receives in a telescoping manner an inner rod portion 98B 100B which is longer than the outer tubular portion. This construction permits the compression plates 78, 80 to move from their position shown in FIG. 1, in which metal anode fuel plates 64 in the metal-air cells 26A are fresh and have their full thickness, to their position shown in FIG. 3A, in which the cells are expended by consumption of the anode fuel plates (now either completely expended or of substantially reduced thickness). More specifically, the tubular portions 98A, 100A and rod portions 98B, 100B are sized so that the rod portion may retract into the tubular portion at least a sufficient distance to permit travel of the compression plates 78, 80 between their FIG. 1 and FIG. 3A positions.

An actuator link 102 is connected by pivots on each end to the rotor 96 and to the lid 28, so that opening the lid causes the actuator link to rotate the rotor in the first direction indicated by arrow 104. Initially, the push bars 98, 100 may telescopically reduce more in length by sliding of the rod portions 98B, 100B into the tubular portions 98A, 100A. However, when the end of the rod portions 98B, 100B inside the tubular portions 98A, 100A reach the inner end of the tubular portions (bottoms out), the push bars become fixed in length and push the compression plates 78, 80 apart as the rotor 96 continues to rotate. The compression plates 78, 80 release the compressive force of the spring 86 on the cell group 26 and the compression plates are spaced apart for removal of an expended cell group 26 and insertion into the case between the plates a fully fueled cell group 26 (having anode fuel plates 64 of full thickness), or for replacement of any free standing cell or cells within the group, or for replenishment of the anode assemblies 52 within the cells 26A while still in the case by removal and replacement of the current collector 66 with anode fuel plate remains thereon, as described more fully hereinafter. After replacement or replenishment of the metal-air cells 26A, the lid 28 can be closed thereby causing the rotor 6 to rotate in a second direction (indicated by arrow 106) opposite the first direction 104 to permit the force of the springs 86 to compress the cell group 26.

The fuel remaining sensor 46 is schematically illustrated in FIG. 1 of the drawings. Generally, the sensor 46 measures the collective thickness of the anode fuel plates 64, the sensor being electrically connected to an external gage (not shown) via the instrumentation connector 44 to provide an electrical signal for displaying the amount of fuel remaining, or indicating a low fuel condition. In the illustrated embodiment, the fuel-remaining sensor 46 is a potentiometer having a resistance member 108 firmly mounted in the case 20 and a slider 110 firmly mounted on and moving with the second compression plate 80. Both the fixed resistance member 108 and the slider 110 are electrically connected to the instrumentation connector 44 and constitute part of an external potentiometer circuit (not shown). As the anode fuel plates 64 are expended, the second compression plate 80 moves to the left causing the slider 110 to move across the fixed resistance member 108 of the sensor 46 and changes the resistance of the potentiometer circuit. In certain applications, the potentiometer may be replaced by a switch or variable reluctance device. The details of the sensor 46 and methods for displaying fuel remaining from its output are well understood by those of ordinary skill in the art. One or more temperature sensors (not shown) are located within the case for detecting the temperature of components within the case. The temperature sensors are also connected via the instrumentation connector 44 to an external monitoring circuit (not shown) which in turn is capable of altering the air flow and electrolyte flow through the case 20 in response to sensed temperature.

The free standing metal-air cells 26A are physically supported and electrically inter-connected by terminal receptacle means mounted inside near the bottom of battery case 20, indicated generally at 112 (FIGS. 4 and 5), the terminal receptacle means being constructed to maintain electrical connection as the cells move with respect to each other and the case as the anodes are expended and the cells compress to maintain fixed spacing between the anodes and cathodes within each cell 26A under the force of the compression plates 78, 80. The terminal receptacle means 112 includes an insulating terminal block 114 for each cell 26A in the cell group 26 in the case 20, with each insulating terminal block mounting one cathode receptacle 116 and one anode receptacle 118. The cathode and anode receptacles 116, 118, and the cathode terminals 72 and anode terminals 68 are constructed for releasable, plug-in interconnection and for conducting high currents produced by the cells 26A. More specifically, the cathode and anode receptacles 116, 118 each comprise a spring clip having a pair of electrically conductive, resilient opposing arms 116A, 118A shaped and arranged so that the arms are separated at one location a distance less than the thickness of cathode terminal 72 and anode terminal 68. Thus, as the cathode terminal 72 and anode terminal 68 are inserted between the arms 116A, 118A of the respective clips, the conductive receptacle arms are deflected from their relaxed positions and bear against the cathode and anode terminals to maintain electrical contact with the terminals. The arms 116A and 118A of the clips are shaped so that firm electrical contact with the corresponding anode or cathode terminal 68, 72 is maintained over a wide conductive area to minimize resistive loses that might otherwise occur under high current carrying conditions.

Figure 4:
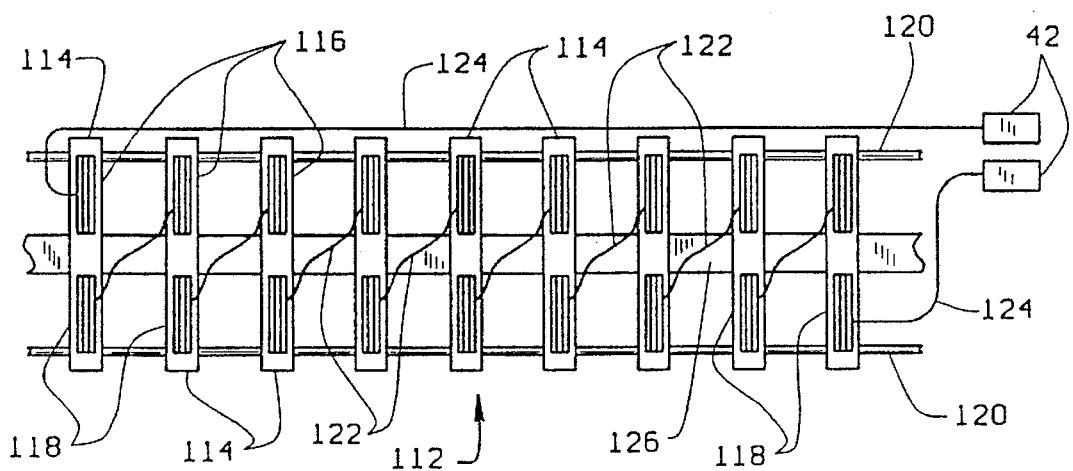
FIG. 4 is a schematic top plan view of the battery case receptacles for anode and cathode terminals of the metal-air cells shown apart from the remainder of the battery case.
Figure 5:
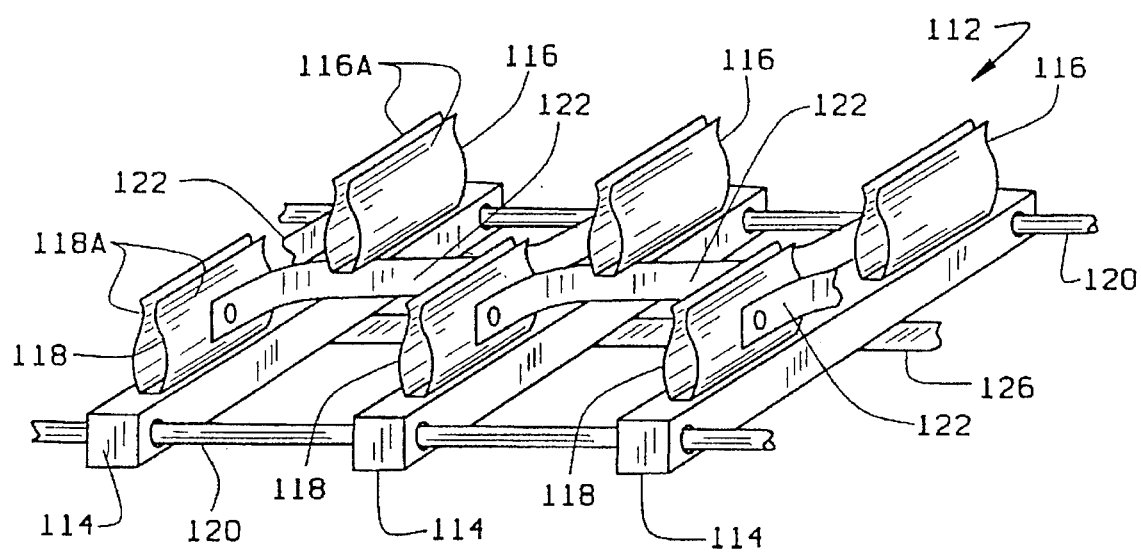
FIG. 5 is a schematic fragmentary perspective view of the battery case receptacle terminal blocks with receptacles mounted thereon and retaining rods therefor shown apart from the remainder of the battery case.

Each terminal block 114 is mounted within and attached to the battery case 20 by a pair of horizontal non-conductive retaining rods 120 extending lengthwise of the case. Each terminal block 114 has holes appropriately located and sized so that the block is capable of sliding motion along the retaining rods with a motion that is generally lengthwise of the case 20. Adjacent metal-air cells 26A in the cell group 26 are electrically connected in series by flexible, flat, woven strap, high current, electrical conductors 122 connecting the anode receptacle 118 for one cell 26A to the cathode receptacle 116 for the adjacent cell 26A, placing the cells in series connection. As shown in FIG. 4., the anode receptacle 118 at one end and the cathode receptacle 116 on the terminal block 114 at the opposite end of the cell group are connected by other suitable flexible conductors 124 to the power connectors 42. The flexible conductors 122, 124 permit electrical connection to be maintained as the cells 26A and terminal blocks 114 move relative to each other. As previously noted, when the metal-air cells 26A contain fresh anode fuel plates 64 of full thickness, the terminal blocks 114 are spaced apart, but they move closer together as the anode fuel plates in the cells diminish in thickness. The terminal blocks 114 are returned to their initial, spaced apart position when the lid 28 is opened. This is accomplished by tethering the terminal blocks 114 to the compression plates 78, 80 by non-conducting flexible strap 126 connected at its opposite ends to the first and second compression plates, respectively by brackets 127. As the terminal blocks 114 move closer together, the strap 126 flexes (FIG. 3A). However, when the compression plates 78, 80 are forced apart by the actuator mechanism, the strap 126 is pulled taut thereby moving the terminal blocks 114 back to their initial, spaced apart position.

As an alternative to unplugging and removing the metal-air cell group 26 from the case 20, the cells 26A can be replenished by replacement of the expended split anode fuel plates 64 and associated current collectors 66 in each cell. The free standing cells 26A are particularly constructed to be rugged and to facilitate quick and easy replacement of individual cells within the group and/or in-place refueling by removal of the current collectors 66 with expended split anode fuel plates 64 thereon. Referring now to FIGS. 6 and 7, the first and second flexible walls 48 of cell 26A are bonded and sealed to a solid base block (designated generally by reference number 128) along their bottom edge margins, leaving an open top. However, when readied for use, the top is closed and sealed by bringing together elongate sealing beads 130 attached to opposing upper edge margins of the walls 48 and holding them together by placing an elongate spring closure 132 over the upper edge margins. The sealing beads 130 can be made of synthetic rubber or other suitable material. To replace expended split anode fuel plates 64 and associated anode current collectors 66 in the cell 26A, the spring closure 132 removed and the sealing beads 130 separated to reopen the top of the cell.

The two metal anode fuel plates 64 (FIGS. 6 & 13) are consumed as part of the electrochemical reaction and are capable of producing high current in the cell 26A, but the chemically non-reactive anode current collector 66 is not consumed. Referring to FIGS. 12A, 13, the anode current collector 66 is particularly constructed for mounting split anode fuel plates 64, including a generally upwardly extending conductive plate portion 134 having opposite conductor faces, and angled lip portions 136 extending outwardly from the bottom of the conductive plate portion 134 in opposite directions from each other. In the preferred embodiment, the conductive plate portion 134 and angled lip portions 136 are made as one piece out of a suitable conductive, chemically non-reactive material (e.g. nickel-plated copper). The angled lip portions 136 each have support surfaces 138 on which the fuel plates 64 rest. In FIGS. 10A and 10B, the fuel plates 64 have been removed to show the support surfaces 138. The support surfaces 138 slope downwardly toward the conductive plate portion 134 so that the fuel plates 64 are urged toward the conductive plate portion, which has opposing vertical faces sized and shaped for lying in face to face relation, and providing intimate physical and electrical contact with the fuel plates.

The split anode fuel plates 64 are shaped in a fashion complementary to the support surfaces 138 of the angled lip portions 136 to aid in maintaining their electrical contact with the respective faces of the conductive plate portion 134. More specifically, (FIGS. 12A & 12B) each anode fuel plate 64 is bevelled (angle α, typically 10°) at its lower edge 142 so that when the anode fuel plate engages the support surface 138 at its lower edge the bevel aids in urging the anode fuel plate toward the conductive plate portion 134. In addition, the lower edge 142 of each anode fuel plate 64 is sloped (angle β, typically 5°) from one lateral edge 144 of the anode fuel plate to the other lateral edge 146 such that the shape of the anode fuel plate is rhomboidal. The support surfaces 138 of the angled lip portions 136 are sloped (angle β) in a complimentary manner from one lateral edge 148 of the conductive plate portion 134 to the other lateral edge 150. The support surfaces 138 on each side of the conductive plate portion 134 slope in opposite directions. Along the lateral edge 148, 150 of the conductive plate portion 134 at the lower end of each support surface 138 is a stop bar 152 positioned to engage one of the lateral edges 144, 146 of the anode fuel plate 64 to hold the plate in correct alignment with current collector 66. Thus, when the anode fuel plate 64 is placed on the corresponding angled lip portion 136 it is urged both against the face of the conductive plate portion 134 and against the stop bar 152.

Removal of the split anode fuel plates 64 together with the anode current collector 66 from the cell 26A requires simple disconnection of the anode current collector from the electrical circuit of the battery. As shown in FIGS. 6, 10A and 10B, the lower end of the anode current collector 66 and the portion of the anode terminal inside the cell 26A are constructed for releasable, spring acting connection of one to the other. The lower end of the anode current collector has a downwardly opening, generally inverted-V shaped channel 154 formed it and sized for receiving the generally inverted-V shaped crown 156 at the top of the portion of the anode terminal 68 inside the cell 26A. The anode current collector 66 has a spring clip including a pair of conductive spring clip members 158 mounted in generally opposing relation and extending from the bottom of the current collector 66. The spring clip members 158 are formed so that their smallest separation is less than the greatest width of the crown 156. Thus, when the anode current collector 66 is pushed down onto the V-shaped crown 156 of the anode terminal 68, the spring clip members 158 engage the crown and are forced apart. Although not shown, the portion of the anode terminal 68 inside the cell 26A may taper below the widest portion of the crown 156 to permit the spring clip members to move toward their relaxed positions. The spring clip members 158 continue to maintain a spring holding force on the portion of the anode terminal 68 inside the cell 26A when the current collector 66 is fully connected to the terminal as shown in FIG. 10A to assure electrical conductivity. Moreover, the spring clip members 158 contact the anode terminal 68 over a wide area for good electrical connection. Disconnection of the current collector 66 from the anode terminal 68 is achieved by applying an upward force on the current collector sufficient to overcome the grip of the spring clip members 158 on the crown 156. In this way, repeated, non-destructive electrical disconnection and re-connection is made possible. Replenishment of the cell 26A by replacement of the split anode fuel plates 64 also has an advantage over replacement of the entire cell 26A in that it is not necessary to disconnect the tubes 58A, 62A circulating electrolyte to and from the free standing cell.

The flexible outer material 48A of the two layer cell wall 48 provides a porous, hydrophobic structure which, together with the current distributor constitute the cathode 50, enables atmospheric oxygen to pass through and reach the inner surface that is electrolyte wetted. At the same time, the outer material 48A prevents electrolyte from passing through in the opposite direction. The catalytic film 48B and the current distributor 70 aid the electrochemical process of extracting oxygen from the air to combine with water in the electrolyte to form hydroxyl (OH) ions at the cathode 50. In normal cell operation, where ample depolarization air is supplied, these ions are formed in solution and migrate to the anode fuel plates 64 where they combine and form X(OH), molecules or ions. The catalytic film 48B may be covered on its inner surface (i.e., between the catalytic film and the current distributor 70) by a protective layer of hydrophilic polymer (not shown) provided that such protection offer no resistance to the migration of ions (electrolyte current flow).

The outer flexible material 48A of the cell wall 48 is made of any membrane that is hydrophobic (e.g., fibers having a porosity of 15% to 85% with a resulting fabric porosity ranging between 0.01 to 100 microns and a thickness of 0.5 to 10 millimeters) and whose chemical activity is acceptable. Typically, cell wall membrane materials include polymers of fluorinated hydrocarbons such as polytetrafluoroethylene (PTFE), polytrifluoroethylene, polyvinylfluoride and polyvinylidenefuoride. Outer cell material can also be a co-polymer material consisting of two of the preceding or of other materials which typically include acrylonitrile, methacrylate and polyethylene as disclosed in U.S. Pat. No. 3,513,030-M.G. Rosansky et al. dated 19 May 1970, and Lawrence Livermore National Laboratory Report UCRL-81168-dated 26 May 1978. The catalytic film 48B is applied directly to the inside of the outer wall material membrane 48A as a coating and in a manner that does not materially affect the hydrophobic qualities of the material. The catalyst can be one of a number of materials such as platinum black, platinum/carbon, silver/carbon or cobalt tetramethoxyphenylporphyrin (CoTMPP and commonly called "porphyrin").

The cell wall material 48A is preferably woven into a tube (not shown), using techniques similar to those used for making fire hose reinforcement. Preferably, the tube is relatively long and the cell's walls 48 are formed from a section of the tube which is cut away from the remainder. The tube section is dimensioned so that when flattened, its length and width correspond to the desired length and width of the cell walls 48. At one open end of the tube section, which will become the top of the cell, the sealing beads 130 are applied on opposing interior walls. The electrolyte outlet 60 is formed by making a hole in the tube section near the top and bonding a Teflon® or other suitable tubing in the hole. The bottom of the tube section is bonded to the base block 128. As one alternative, the cell walls 48 may be formed by folding over a long strip of material and sealing the edges to form a tube. Sections of that tube can then be cut off to form individual cell walls.

It is to be understood that the physical cell may be otherwise fabricated and still fall within the scope of this invention.

The base block 128 of each free standing cell 26A provides a rigid mount for the anode and cathode terminals 68, 72, and may be formed from any of a wide variety of polymeric materials either foam or solid, that assure containment of electrolyte and provide both electrical insulation for the cathode and anode terminals and structural integrity to assure cell ruggedness. As shown in FIGS. 8 and 9, the base block 128 holds the anode terminal 68 which is bonded in place at the time the base block is formed, the anode terminal extending through the base block from generally inside the cell to outside the cell. The base block 128 also mounts the cathode terminal 72 on its bottom in spaced relation from the anode terminal 68. In a dual cathode configuration, the cathode terminal 72 includes four terminal bus bars 160 which are bonded to and extend around the base block 128. The electrolyte inlet port 56 of the cell 26A is formed in the base block 128 and (in the dual cathode configuration) feeds into two internal passages 162 in the base block for passage and distribution of the liquid electrolyte inside the cell (FIG. 7). The inlet port 56 is preferably made of Teflon® or other suitable material. Each passage 162 has multiple openings 164 in an upper face of the block 128 for distribution of the electrolyte into the cell 26A. Each opening 164 is located between adjacent, vertically extending major conductors 166 of a respective one of the current distributors 70. The locations of the openings 164 assure uniform introduction of electrolyte into the interior of the cell 26A and permit the cell to be thoroughly flushed of depleted electrolyte and anode reaction byproducts. Adjacent major conductors 166 on the current distributor 70 effectively form a channel within the cell 26A which restricts electrolyte flow to some extent from the channels formed by other adjacent pairs of major conductors on the current distributor. The provision of an opening 164 to introduce fresh electrolyte into each channel also enhances maximum flushing of the entire cell 26A channel by channel. The base block 128 may be formed by use of a positioning form that locates and holds the anode terminal 68, cathode terminal 72, bus bars 160, and electrolyte plenum consisting of inlet 56, distribution passages 162 and openings 164, in a holding fixture which also is a mold. A polymeric material can then be introduced to the fixture as a semi-liquid and allowed to set up and cure into a solid base block 128.

One of the two cathode high current distributors 70 in each cell is shown in FIG. 9 apart from the cell 26A, current collector 66 and fuel plates 64. The high current distributor 70 comprises a screen 168 augmented by the vertically extending major conductors 166 attached such as by welding to the screen and sized to conduct high currents generated by the cell 26A. For a dual cathode cell, the screen 168 and major conductors 166 of each high current distributor 70 are sized so that the combined electrical conductance is capable of carrying 60% of the total rated current generated by the cell 26A in each current distributor without significant conductive ($I^2R$) losses. The other cathode high current distributor 70 is of identical construction, and has been broken away in FIG. 9 for clarity. In cell 26A, the screen 168 is placed in intimate contact with the catalytic film 48B on the inside of the cell wall 48. The lower edge of the screen 168 and lower ends of the major conductors 168 of the cathode current distributor 70 are soldered or welded to a distributor bus 170 extending the width of the lower edge of the screen.

The distributor bus 170 is electrically connected by two flexible conductor straps 74 (and in a dual cathode cell, each strap 74 is sized for conducting 30% of total rated cell current) to two corresponding cathode terminal bus bars 160 connected to the cathode terminal 72. The flexible conductor straps 74 permit the current distributor 70 to move with the cell wall 48 while maintaining electrical connection with the cathode terminal 74. The current distributor 70 and flexible conductor straps 74 are preferably made of copper and plated with nickel or other suitable material such as zirconium, titanium or tungsten, to prevent corrosion. The cathode to anode spacers 76 are formed on the high current distributor 70 in the preferred embodiment by molding a plurality of cones of electrically insulating material to the major conductors 166, the cones being sized to maintain a spacing of approximately 1.5 to 3 millimeters between the anode fuel plates 64 and the cathode 50.

In view of the above, it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

I claim:

1. A metal-air cell battery comprising:
   a battery case assembly, the battery case assembly comprising a box with a lid defining an internal volume dimensioned to accommodate a metal-air cell group, the battery case having an air inlet and an air outlet formed therein;

a metal-air cell group having a plurality of stand-alone, individually replaceable compressible metal-air cells arranged in a row, each of the metal-air cells being constructed to contain an electrolyte;

dual cathodes and a split anode assembly within each metal-air cell;

a plurality of air diverter-separators, one of each air diverter-separators being positioned between two of the air-metal cells;

terminal connectors and conductors in the case assembly for supporting and electrically interconnecting the metal-air cells of the metal-air cell group in series;

an electrolyte supply means having an electrolyte inlet means and a spent electrolyte outlet means operatively associated with the metal-air cell group;

electrical connector means on the case assembly for electrically connecting the metal-air cell group to an external load;

instrumentation means for monitoring the anode remaining and an internal temperatures within the case assembly;

means for positioning and compressing the metal-air cell group within the case assembly, the means further comprising supporting base connectors, a first compression member that engages a first end of the metal-air cell group, a second compression member that engages a second end of the metal air cell group, and means for urging the first and second compression members toward each other; and an acutator mechanism operatively associated with the lid for forcing the first and second compression members apart when the lid is opened and thereby positioning the individual cells of the cell group for anode replacement;

wherein the means for urging the first and second compression members toward each other substantially maintain the dual cathodes and the split anode at a set spacing as the anode is expended during operation of the battery.

2. The metal-air battery of claim 1 further comprising a hinge means for connecting the lid to the battery case assembly to permit movement of the lid between an open position to provide access to the internal volume of the case assembly or installation or removal of individual metal-air cells.

3. The metal-air battery of claim 2 wherein the actuator mechanism is connected to the lid by an actuator link whereby opening the lid causes the actuator means to urge the first and second compression members apart and whereby closing the lid causes the actuator means to release the first and second compression members thereby allowing the respective compression members to compress the metal-air cells.

4. The metal-air battery of claim 3 wherein the actuator mechanism further comprises a rotor positioned between the first and second compression members, a first push bar pivotally attached at one end of the rotor and pivotally attached at an opposite end to the first compression member, a second push bar pivotally attached at one end to the rotor and pivotally attached at an opposite end to the second compression member, the actuator link being connected to the rotor to effect movement of the rotor upon the opening and closing of the lid.

5. The metal-air battery of claim 4 wherein the actuator mechanism further comprises a center anchor, the rotor being pivotally mounted on the center anchor and wherein the urging means comprises at least one spring extending between each compression member and the center anchor.

6. The metal-air battery of claim 4 wherein the first and second push bars each are partially telescopically retractable to allow the first and second compression members to move closer to each other under pressure of the urging means.

7. The metal-air battery of claim 4 wherein the actuator link is pivotally connected to the lid whereby opening of the lid causes rotation of the rotor in a first direction to force the first and second compression members apart simultaneously spacing the cells apart for servicing and closing the lid causes rotation of the rotor in a second direction opposite the first direction to permit the first and second compression members to compress the metal-air cell group.

8. The metal-air battery of claim 1 further comprising a connector means in the battery case assembly for connecting the instrumentation to external circuit means for monitoring and controlling the metal-air battery.

9. The metal-air battery of claim 1 wherein the first and second compression members each comprise a compression plate having a compression face disposed in the battery case assembly for engagement with one end of the metal-air cell group, each compression plate being mounted by two guide tracks mounted in the battery case assembly, the guide tracks each having a guide channel therein configured to receive therein, in a freely sliding manner, mounting members of the compression plates.

10. The metal-air battery of claim 1 further comprising terminal receptacle means for supporting and connecting the metal-air cell group, the terminal receptacle means including an anode receptacle for each anode terminal of each metal-air cell and a cathode receptacle for each cathode terminal of each individually replaceable metal-air cell, the terminal receptacle means being mounted in the case to permit movement of the metal-air cells relative to each other and relative to the case assembly.

11. The metal-air battery of claim 10 wherein the terminal receptacle means further comprises an insulating terminal block for each individual cell and having a pair of anode and cathode electrical receptacles, each terminal block having holes formed therein, the anode and cathode receptacles of adjacent terminal blocks being electrically connected in series by flexible conductors which permit relative movement between adjacent pairs of anode and cathode receptacles, and wherein the battery case assembly further comprises a pair of non-conductive retaining rods extending generally parallel to each other within the case, the rods being inserted through the holes formed in the terminal blocks and affixed to the case assembly thereby supporting the individual metal-air cells while permitting the terminal blocks to slide along the rods.

12. The metal-air battery of claim 11 further comprising a non-conductive strap tethering the insulating terminal blocks to the first and second compression plates whereby the terminal blocks and the individual metal-air cells are drawn away from each other as the actuator mechanism forces the compression plates apart.

13. The metal-air battery of claim 1 wherein the metal-air cell group further comprises one or more individual metal-air cells, an air diverter-separator on the outside of the individual metal-air cell at a first end of the group and on the outside of an individual metal-air cell at the opposite end of the group and an air diverter-separator positioned between each individual metal-air cell within the group, each air diverter-separator being hollow and having a top air inlet and a bottom air outlet for passage of depolarization air through each air diverter-separator, each air diverter-separator having a plurality of vertically-spaced, internal louvers for uniformly disbursing air passing through the air diverter-separator across a surface of the cathode of each adjacent metal-air cell, the louvers defining an air flow passage through the air diverter-separator from the top inlet to the bottom outlet, the air flow passage being constricted in the direction of air flow through the air diverter-separator.

14. A stand-alone individually replaceable metal-air battery cell comprising:

a solid base for mounting anode and cathode terminals;

flexible and compressible first and second walls defining an internal space secured to the solid base, at least one of the walls including an air-permeable and electrolyte impermeable air cathode, the air cathode including a cathode current distributor;

a cathode terminal on the solid base and connected to the current distributor;

an anode assembly including a current collector with metal anode fuel plates on each side thereof within the internal space, the fuel plates being located in generally parallel and opposed relationship to the air cathode, the anode current collector being configured to assure proper positioning of the metal anode fuel plates and to provide electrical contact and connection to the metal fuel plates, the opposed parallel positioning of the air cathode and the metal fuel plates disposed to assure uniform electrochemical reaction in the presence of an electrolyte and depolarization air within the internal space to produce electrical power;

an anode terminal extending through the solid base from a location within the internal space to a location generally exterior to the metal-air cell;

spacer means between the air cathode and the metal anode fuel plates for preventing the metal anode fuel plates from contacting the air cathode;

the anode current collector being electrically conductive and chemically non-reactive in the presence of an electrolyte and non-reactive during the electrochemical reaction between the metal anode fuel plates and the air cathode.

15. The metal-air cell of claim 14 wherein the anode current collector comprises a conductive plate sized and shaped for lying in a face-to-face relation with the metal anode fuel plates located on each side thereof to conduct current from the metal anode fuel plates, each side of the current collector having a lip portion extending outwardly from the conductive plate generally at the bottom thereof, the lip portion being constructed to support the metal anode fuel plate and to urge the metal anode fuel plate toward the conductive plate.

16. The metal-air cell of claim 15 wherein the lip portion on each side of the current collector comprises a surface sloped inwardly toward the conductive plate, the sloped surface being sized and shaped for supporting the metal anode fuel plate and urging the fuel plate toward the conductive plate.

17. The metal-air cell of claim 15 wherein each metal anode fuel plate comprises a generally flat plate having a beveled lower edge portion that matches and mates with the sloped surface of the lip portion of the current collector.

18. The metal-air cell of claim 17 wherein the lip portion also is sloped laterally of the conductive plate portion so that the slope surface also urges the metal anode fuel plate toward a lateral edge of the anode current collector.

19. The metal-air cell of claim 18 further comprising a stop bar on each side of the current collector conductive plate generally at one lateral edge thereof, the stop bar being located and shaped to retain the metal anode fuel plate from laterally sliding off the lip portion.

20. The metal-air cell of claim 19 wherein the lower edge portion of the metal anode fuel plate is sloped laterally of the metal anode fuel plate.

21. The metal-air cell of claim 14 wherein the metal-air cell has a top means for opening and closing and wherein a portion of the anode terminal located above the solid base block cell and a lower portion of the anode current collector have mating halves of a quick disconnect that permits connection of one to the other whereby expended metal anode fuel plates and associated anode current collector may be disconnected from the anode terminal and removed from the metal-air cell through the top means, the anode current collector re-inserted with new metal anode fuel plates positioned thereon into the metal-air cell through the top means and connected to the anode terminal.

22. The metal-air cell of claim 21 wherein the quick disconnect further comprises spring means associated therewith gripping and making electrical contact between the anode current collector and the portion of the anode terminal that lies within the metal-air cell, said spring means permitting repeated disconnection and reconnection between the anode current collector and the anode terminal.

23. The metal-air cell of claim 22 wherein said spring means comprises a spring clip having a pair of spring clip members mounted on the anode current collector at spaced apart locations, the anode current collector being shaped for receiving a portion of the anode terminal therein, the anode terminal being shaped for displacing the spring clip members from their relaxed positions thereby to cause the spring clip members to bear against the anode terminal with a springs holding force and assure firm electrical connection.

24. The metal-air cell of claim 14 wherein the solid base is bonded and sealed to the first and second walls of the cell generally at the bottom thereof, the solid base block mounting the cathode and anode terminals thereon with the anode terminal extending through the base block and sealed thereto.

25. The metal-air cell of claim 24 wherein the solid base block has electrolyte passage means therein for transmission of electrolyte from the exterior of the metal-air cell for the distribution of the electrolyte within the pocket.

26. The metal-air cell of claim 25 wherein the cathode current distributor comprises a distributor screen, the distributor screen being generally thin and flat and having opposite faces, and space apart, elongated major conductors, each major conductor being electrically connected to the distributor screen along its length and the major conductors extending across one face of the distributor screen thereby increasing the current carrying capacity of the metal-air cell.

27. The metal-air cell of claim 26 wherein the elongated major conductors extend across the face of the distributor screen in substantially parallel relation to each other, generally from top to bottom of the distributor screen, each pair of major conductors defining a vertical channel for flow of electrolyte, and wherein the electrolyte distribution means in the base block has an opening into the metal-air cell for each pair of adjacent major conductors, the openings being positioned to direct fresh electrolyte into the metal-air cell between each pair of adjacent major conductors and for thoroughly flushing depleted electrolyte and anode reaction byproducts from the metal-air cell.

28. The metal-air cell of claim 26 wherein the cathode current distributor further comprises a solid distributor bus, and wherein the distributor screen has a generally thin, rectangular shape, the major conductors each positioned at even intervals across the screen generally from one edge to an opposite edge and extending from the top to bottom of the screen, the distributor bus being connected to the screen and to the major conductor at a bottom edge margin of the current distributor screen.

29. The metal-air cell of claim 14 further comprising at least one flexible electrical conductor connecting the cathode terminal to the cathode current distributor thereby to permit movement of the cathode current distributor relative to the cathode terminal.

30. A stand alone metal-air battery cell comprising:

a solid base that mounts anode and cathode terminals;

flexible, compressible first and second opposing walls defining a pocket and having a top opening and sealing means;

at least each of the walls including an air-permeable and electrolyte-impermeable air cathode, each air cathode including a cathode current distributor;

a cathode terminal electrically connected to the cathode current distributors, the cathode terminal being located at and affixed to the base block outside the cell;

a split anode assembly comprising a current collector with metal anode fuel plates on each side thereof within the pocket, the fuel plates being located in generally opposing relationship to the air cathodes, the anode current collector configured to assure contact with, physical mounting of and electrical connection to metal anode fuel plates, the metal anode fuel plates and air cathodes having an electrochemical reaction in the presence of the electrolyte and depolarization air to produce electrical power;

an anode terminal extending from a location within the air-metal cell passing through and affixed to the solid base at a location generally exterior of the air-metal cell;

spacer means between the air cathodes and the metal anode fuel plates for preventing the metal anode fuel plates from contacting the air cathodes;

the cathode current distributor comprising a distributor screen, the screen being generally thin and flat and having opposite faces, and spaced apart, major electrical conductors each connected to the screen along its major length and extending across one face of the screen thereby increasing the current carrying capacity of the cell.

31. The metal-air battery of claim 30 wherein the cathode current distributor further comprises a solid distributor bus, and wherein the distributor screen is a generally thin, rectangular shape, the major electrical conductors each extending across the screen generally from one edge of the screen to an opposite edge of the screen, the distributor bus being electrically connected to the screen and major electrical conductors along one edge margin of the screen and corresponding end of the major conductors.

32. The metal-air cell of claim 30 further comprising at least one flexible electrical conductor connecting the cathode terminal to the distributor bus of the cathode current distributor thereby to permit movement of the cathode distributor relative to the cathode terminal while maintaining an electrical connection between the current distributor and the cathode terminal.

* * * * *